United States Patent [19]

Tiedemann

[11] Patent Number: 5,443,600

[45] Date of Patent: Aug. 22, 1995

[54] GROOVED SEPARATOR ELECTRODE COMPOSITE

[75] Inventor: William H. Tiedemann, Cedarburg, Wis.

[73] Assignee: Globe-Union Inc., Milwaukee, Wis.

[21] Appl. No.: 129,890

[22] Filed: Sep. 30, 1993

[51] Int. Cl.[6] .......................................... H01M 10/04
[52] U.S. Cl. .................................. 429/134; 429/138; 429/143; 429/162; 29/623.1; 29/623.5
[58] Field of Search ................ 429/134, 135, 138, 143, 429/147, 162, 210, 238, 208; 29/623.1, 623.5

[56] References Cited

U.S. PATENT DOCUMENTS

| | | | |
|---|---|---|---|
| 1,443,321 | 6/1922 | Leitner | 429/238 |
| 4,239,839 | 12/1980 | McDowall et al. | 429/154 |
| 5,252,105 | 10/1993 | Witherspoon et al. | 29/623.1 |

Primary Examiner—Stephen Kalafut
Assistant Examiner—M. Nuzzolillo
Attorney, Agent, or Firm—Leonard J. Kalinowski; E. L. Levine; Joseph E. Root, III

[57] ABSTRACT

A battery cell includes at a plurality of composite separator/electrode structures, each composite structure including a support member having a plurality of parallel, closely spaced ribs defining a plurality of grooves which extend longitudinally of the support member, alternating ones of the grooves having a positive paste of an active material therein, and the remaining grooves having a negative paste of an active material therein, and a current collector lead wire in each groove embedded in the paste and centrally located in the groove with the terminal ends of the lead wires of the positive electrodes extending out of one end of the composite structure and being interconnected to form a positive termination, and the terminal ends of the lead wires of the negative electrodes extending out of the opposite end of the composite structure and being interconnected to form a negative termination, a plurality of the battery cells being stacked together to form a battery having a desired amp hour capacity. Also disclosed is a method of making the composite separator/electrode structure wherein a first layer of positive and negative paste material is applied to alternate grooves to fill the grooves to half their volume, the lead wires are placed on the paste in each of the grooves, and then a second layer of positive and negative paste material is applied to the grooves to fill the grooves and encapsulate the lead wires in the paste material.

15 Claims, 2 Drawing Sheets

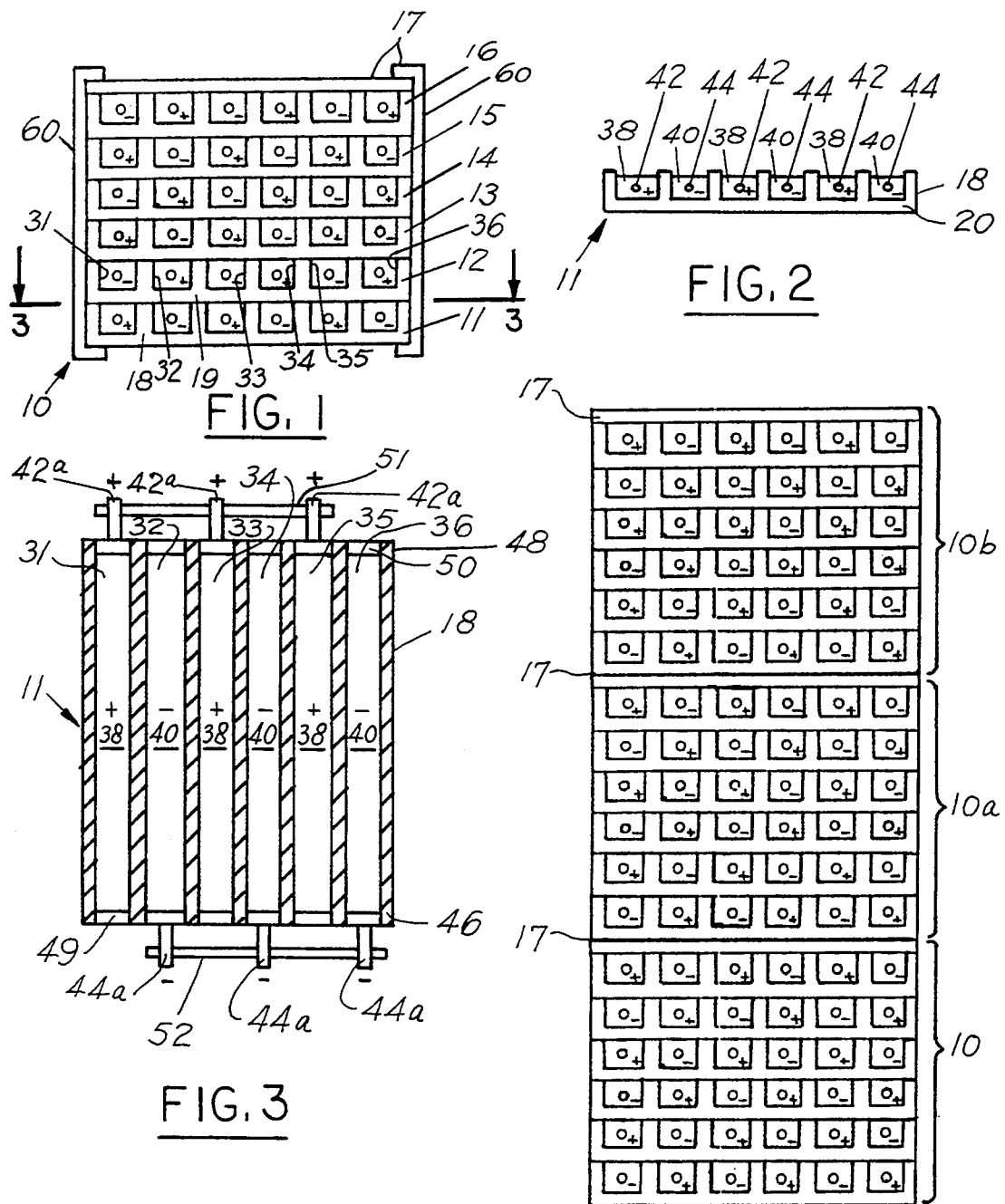

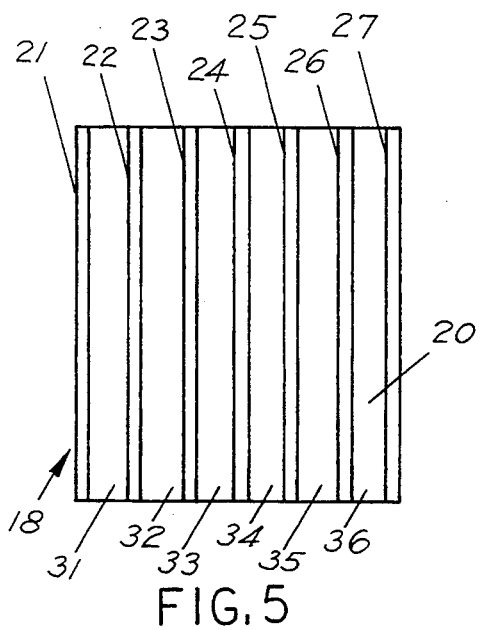
FIG. 5
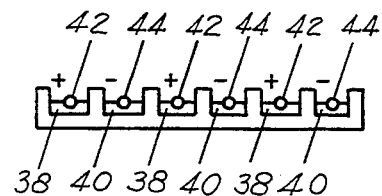
FIG. 8
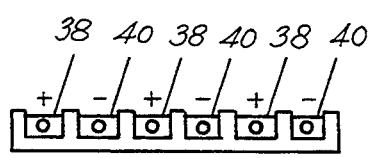
FIG. 10
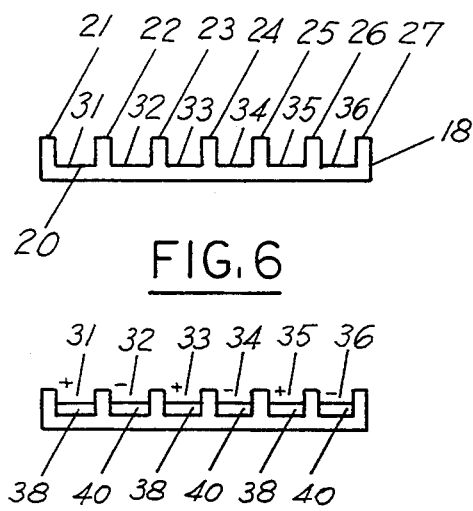
FIG. 6
FIG. 7
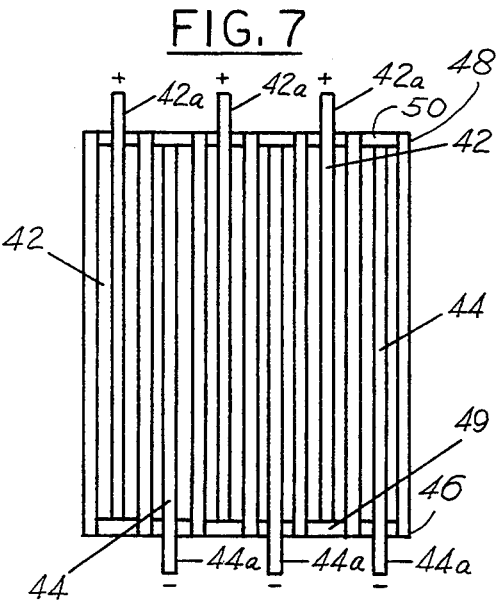
FIG. 9

GROOVED SEPARATOR ELECTRODE COMPOSITE

BACKGROUND OF THE INVENTION

This invention relates to storage batteries, and more particularly to an improved battery cell structure.

One known battery battery cell structure includes a monoblock separator forming honeycomb type structure that defines an 8×8 matrix of compartments, each including a lead wire current collector. The lead wire current collectors comprise a plurality of lead wires, some of the lead wires being coated with a positive paste of an active material and the other lead wires being coated with a negative paste of an active material. The lead wire coatings are produced by dipping precut wires, which are 1 mm. to 1.5 mm. in diameter and 100 mm. to 200 mm. in length, into a supply of the positive or negative paste to form lead wire elements having a square cross section which is 2.5 mm. to 3 mm on each side.

One disadvantage of this battery structure is that the monoblock separator is very expensive to produce and its honeycomb structure complicates the process of inserting the current collectors into the compartments of the monoblock, particularly because of the relative small size of the current collectors. Moreover, production of the current collectors is difficult because it is hard to control the thickness of the coating using known coating processes, such as a dipping process. The thickness of the coating must be controlled to provide proper operation of the battery cell. Also, the electrode dipping process is very time consuming. This battery structure requires careful control of electrode manufacture and insertion, and the manufacturing process requires repetitive handling of large numbers of individual small wire electrodes.

SUMMARY OF THE INVENTION

The present invention provides a novel battery cell including at least one, and preferably a plurality of flat plate-like support members, having a plurality of parallel, closely spaced ribs which define a plurality of longitudinally extending grooves on one surface of the support member. Alternating ones of the grooves of the support member are pasted with a positive paste of an active material and the remaining the grooves are pasted with a negative paste of an active material. A current collector lead wire is positioned in each of the grooves, embedded in the paste and centrally located within the groove. The ends of the lead wires that are embedded in the positive paste extend beyond the support member at a first end thereof and are connected together forming a positive lead termination. Similarly, the ends of the lead wires that are embedded in the negative paste extend beyond the support member at a second end thereof and are connected together, forming a negative lead termination at the opposite end of the support member. A plurality of the composite separator/electrode structures are stacked together with their positive lead terminations interconnected and with their negative lead terminations interconnected to form a battery cell having a predetermined voltage and ampere-hour capacity. Moreover, a plurality of the battery cells can be stacked together to form a battery structure that has a desired voltage and ampere-hour capacity.

Further in accordance with the invention, a method of making a battery cell comprises the steps of forming a support of a member having a plurality of grooves therein, providing a first plurality of current collector lead wires with a coating of a positive paste of active material in alternate ones of the grooves of the support member with the ends of the wires extending beyond the support member at a first end thereof, and providing a second plurality of current collector lead wires with a coating of a negative paste of active material in the remaining grooves of the support member with the ends of the wires extending beyond the support member at a second end thereof.

In accordance with a preferred embodiment, in providing the coated lead wires in the grooved separator, a first layer of positive paste material is applied to approximately half the volume of alternate ones of the grooves and a first layer of negative paste material is applied to approximately half the volume of the remaining ones of the grooves. Then, lead wires, which are precut to the proper length, are laid in the grooves on the first layers of the positive and negative paste material. Second layers of positive and negative paste material are applied to respective grooves containing the positive paste and negative paste material, encapsulating the wire lead in each groove. With this method, the pasting operations can be carried out using conventional pasting machines as are known in the art, with slight modification to provide alternate bands of positive and negative paste material. Moreover, the pasting operations can be carried out on a production line basis.

A plurality of the composite structures are stacked one upon the other and the positive lead wires interconnected and the negative lead wires interconnected to form a battery cell having positive lead terminations and negative lead terminations. A plurality of the thus formed battery cells are stacked together and their lead terminations interconnected to form a battery having a desired voltage and amp-hour capability. The cells may be connected in series to form a battery providing a voltage that is the sum of the individual voltages provided by the cells or the cells may be connected in parallel to provide a high capacity battery.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 1 is a front elevation view of a battery cell provided by the present invention;

FIG. 2 is a front elevation view of one of the composite separator/electrode assemblies of the battery cell shown in FIG. 1;

FIG. 3 is a vertical section view taken along the line 3—3 in FIG. 1;

FIG. 4 is a front elevation view of a battery formed by stacking together a plurality of the battery cells provided by the present invention;

FIG. 5 is a top plan view of one of the support members of the battery cell provided by the present invention;

FIG. 6 is a front elevation view of the support member shown in FIG. 5;

FIG. 7 is a front elevation view of the support member with layers of positive and negative conductive paste in accordance with one of the steps in the method of making the composite separator/electrode of the battery cell;

FIG. 8 is a view similar to FIG. 7, but with lead wires shown positioned in the grooves of the support member in accordance with another step in the method of making the composite separator/electrode of the battery cell;

FIG. 9 is a top plan view of the support member shown in FIG. 5, illustrating the position of the lead wires in the grooves of the support member; and, FIG. 10 is a front elevation view of the support member with a second layer of conductive paste therein in accordance with a further step in the method of making the battery cell.

DESCRIPTION OF PREFERRED EMBODIMENTS

Referring to FIGS. 1-3 of the drawings, FIG. 1 is a front elevation view of a battery cell 10 provided by the present invention. The battery cell 10 includes a plurality of composite separator/electrode assemblies or structures 11-16 which are stacked together vertically, one upon the other.

Each composite separator/electrode assembly or structure, such as the composite separator/electrode structure 11 shown in FIG. 2, includes a support member or separator element 18 of a porous, electrically insulating material. Referring to FIGS. 2, 3, 5 and 6, the support member 18 has a flat base portion 20 with a plurality of closely spaced, longitudinally extending ribs 21-27 extending upwardly from the base portion, defining a plurality of channels or grooves 31-36, which extend the length of the support member 18. As shown in FIG. 3, the channels or grooves 31-36 contain alternate layers of positive and negative active materials 38 and 40, in the form of a conductive paste material. For example, channels 31, 33, and 35 include positive paste material 38 and channels 32, 34 and 36 include negative paste material 40. Each layer of positive paste material 38 has a lead wire 42, centrally located as shown in FIG. 2, forming a positive current collector. Similarly, each layer of negative paste material 40 has a centrally located lead wire 44 forming a negative current collector.

As illustrated in FIG. 1, the location of the positive and negative paste materials is staggered for adjacent separator/electrode assemblies, so that for the separator/electrode structure 12, the grooves 31, 33 and 35 of the support member 19 are pasted with the negative paste material and grooves 32, 34 and 36 are pasted with the positive paste material. Each of the positive paste containing channels of composite separator/electrode structures 11-16 have been given a "+" notation, and the negative paste containing channels have been given a "−" notation to differentiate the channels which are pasted with positive paste material from the channels which are pasted with negative paste material in the battery cell. The location (i.e. left to right positioning) of the positive paste containing grooves and negative paste containing grooves for support members 13 and 15 is the same as that for support member 11 and for support members 14 and 16 is the same as that for support member 12.

As is shown in FIG. 3, the paste material 38 and 40 stops short of the front edge or end 46 and the back edge or end 48 of the support member 18, defining a margin 49 at the front end 46 and a margin 50 at the back end 48 of the composite structure so that the paste material is indented relative to the edges of the support to prevent shorting. The terminal ends 42a of the lead wires 42 of the positive lead structures extend outwardly from the back end of the composite structure 11 and the terminal ends 44a of the lead wires 44 of the negative lead structures extend outwardly from the front end of the composite structure 11. The terminal ends 42a of the positive lead wires 42 of the stacked composite separator/electrode assemblies are connected together by an electrically conducting material in a suitable manner, such as by fusing, as represented by the connector element 51, shown in FIG. 3 to provide a positive lead termination. Similarly, the terminal ends 44a of the negative lead wires 44 are connected together by a connector 52 to provide a negative lead termination.

The exemplary cell structure 10 is formed of six composite separator/electrode assemblies, such as composite separator/electrode structure 12, with each separator/electrode structure having three positive electrodes and three negative electrodes. Thus, the total cell structure defines a 6×6 matrix of electrodes, providing a given voltage and amp hour rating for the battery cell. The number of cells 10 defines the capacity of the battery. Several cells can be assembled or stacked together as shown in FIG. 4, where three cells 10, 10a and 10b are stacked together, to provide the desired amperage. The cells are connected in series, i.e., the negative lead termination of cell 10 is connected to the positive lead termination of cell 10a and the negative lead termination of cell 10a is connected to the positive lead termination of cell 10b, to form a battery providing a voltage that is equal to the sum of the voltages provided by the three cells. Alternatively, the three cells can be connected in parallel, i.e., with the positive lead terminations of all three cells being interconnected and the negative lead terminations of all three cells being interconnected, to form a high capacity battery.

Referring to FIGS. 5-10, to produce cells for forming a battery structure, first a plurality of support members, such as support member 18, are produced having a plurality of ribs 21-27 that define the grooves or channels 31-36, as shown in FIGS. 5 and 6. The support members are produced by a molding process. The support member 18 thus formed is fed to a pasting machine (not shown) which introduces alternating layers of positive paste 38 and negative paste 40 into the grooves 31-36 of the support member 18. The positive paste 38 is applied to alternating channels 31, 33, and 35 of the support member 18 so as to fill about one half of the channel volumes as illustrated in FIG. 7. Simultaneously, negative paste 40 is applied to the other channels 32, 34 and 36 of the support member 18 so as to fill about one half of the channel volumes. The paste formulations are similar to those presently used in commercial applications with modifications made to assist in formation. The support member 18 is selectively masked, as is known in the art, so that paste does not extend to the edge of the support member so that margins 49 and 50 are defined at the front edge 46 and back edge 48, respectively, of the support member as illustrated in FIG. 9, for example.

The lead wires 42 and 44 are extruded and cut to a length that corresponds to the length of the grooves. The lead wires 42 and 44 are positioned in the grooves, as shown in FIGS. 8 and 9, with the terminal ends 42a of the positive lead wires 42 extending out of the support member in one direction and the terminal ends 44a of the negative lead wires 44 extending out of the support member 18 in the opposite direction as shown in FIG. 9.

The support member 18 is then moved to a second pasting machine, which is similar to the first pasting machine, where a second layer of paste is applied to each groove, as shown in FIG. 10, substantially filling the grooves and with the lead wires located centrally of the grooves and embedded in the pasting material as illustrated in FIGS. 3 and 10. It is pointed out that the level of the second layer of paste extends to slightly below the top of the grooves, as shown in FIG. 10 to allow for compression when the composite separator/electrode structures are stacked to form a cell. The pasting operations can be carried out using conventional pasting machines as are known in the art, with slight modification to provide alternate bands of positive and negative paste material. Because the paste of active material is applied in a two step operation, preferably two pasting machines are used, one pasting machine applying the first layer of positive and negative paste material and the second pasting machine applying the second layer of positive and negative paste material. The use of separate pasting machines permits the pasting process to be carried out on a continuous production line basis Alternatively, the positive and negative paste material can be extruded onto respective first and second sets of lead wires or coated by a dipping process and then cured in a suitable manner. The sets of lead wires coated with positive material are then laid into alternate grooves 31, 33 and 35 of the support member 18 and the sets of lead wires coated with negative material are then laid into the remaining grooves 32, 34 and 36 of the support member 18.

Then, the formed composite separator/electrode assemblies are stacked to form the desired cell size in the manner of the composite separator/electrode assemblies. The stack of separator/electrode assemblies is compressed and placed in a containment material 60 to hold the cell 10 in a confined geometry. A thin sheet of glass paper (not shown) may be placed over each of the composite assemblies. A plurality of the composite separator/electrode structures are then stacked one upon the other until the desired cell size is obtained. The alternate composite separator/electrode structures 12, 14 and 16 are rotated 180° in a horizontal plane so that the negative electrodes are located overlying the positive electrodes of the adjacent separator/electrode structures in the stack, so that the electrode are staggered from row to row in the stack. The cell 10 of the exemplary embodiment, which is illustrated in FIG. 1, includes six composite separator/electrode structures 11-16. By way of example, such cell may provide a voltage of two volts. The number of separator/electrode structures used is that required to provide the desired voltage and amp hour rating for the battery. The assembled cell is subjected to a Chemsetting process for curing or setting the active paste material. Then, the positive leads are interconnected and the negative leads are interconnected to complete the formation of the battery cell. The individual composite separator/electrode structures can be cured separately and then assembled in the stack to form the battery cell.

A plurality of cells are stacked together to form a battery. The battery of the exemplary embodiment, which is illustrated in FIG. 4, includes three cells 10, 10a and 10b. For a cell voltage of two volts, the three cell stack provides a six volt battery. The stack of cells is then moved to a final machine where the stack of cells is inserted into a containment material (not shown) to hold the cells together and to form cell to cell connections in the manner known in the art for the production of conventional batteries.

Thus, the novel battery structure comprises a battery cell which includes a plurality of composite structures each including a support member having a plurality of grooves or channels therein. Alternating ones of the grooves of each support member have a positive paste of an active material therein and the remaining the grooves have negative paste of an active material therein. Each of the grooves contains a current collector lead wire which is centrally located within the groove and embedded in the paste of active material. The lead wires of the positive electrodes extend out of the support member at one end thereof and are fused together forming a positive lead termination and the lead wires of the negative electrodes extend out of the support member at the opposite end thereof and are fused together at the opposite side of the cell, forming a negative lead termination.

The novel battery structure is made by forming a support member of an electrically insulating material having a plurality of grooves or channels. A plurality of current collector lead wires are provided with a coating of a positive paste of active material to form positive cells and a plurality of other lead wires are provided with a coating of a negative paste of active material to form negative cells. Preferably, the active material coated lead wires are provided by pasting alternate grooves with positive and negative active material to approximately one-half the volume of the grooves, placing a lead wire in each of the grooves, and then filling the grooves with the active material so that the lead wires are embedded in the paste and are centrally located within the grooves. The lead wires coated with positive paste are positioned in alternate ones of the grooves of the support with the ends of the positive electrodes extending out of the separator support at one end thereof and the lead wires coated with negative paste are positioned in the remaining channels with the end of the negative electrodes extending out of the support member at the opposite end. A plurality of the composite separator/electrode assemblies then are stacked together and their positive leads are interconnected and their negative leads are interconnected electrically to form a battery cell. A plurality of the battery cells are stacked together and interconnected electrically to form a battery having a desired amp hour capacity. It is pointed out that in the exemplary embodiment, each composite structure is illustrated as having six grooves or channels and each cell is illustrated as being formed by six such composite structures. However, each composite structure may comprise more or fewer grooves and a cell may have more or fewer composite structures. Also, the number of cells that are stacked together to form a battery depend upon the electrical characteristics of the cell, which vary as a function of size, materials and number of electrodes, for example. While particular embodiments of the invention have been described, various changes and modifications can be made without departing from the spirit and scope of the invention as defined by the following claims.

I claim:

1. A method of making a cell for a battery comprising the steps of:
   (a) providing a support member of an electrically insulating material having a surface with a plurality of parallel grooves therein, said grooves having first and second ends;
   (b) providing a plurality of first lead wires having coating of a paste of a positive active material in alternate ones of said grooves with each of said first lead wires having a terminal end extending beyond said first ends of said alternative grooves at a first end of said support member;
   (c) providing a plurality of second lead wires having a coating of a paste of a negative active material in the remaining ones of said grooves with each of said second lead wires having a terminal end extending beyond said second ends of said remaining grooves at a second end of said support member;
   whereby said support member, said first lead wires with said paste of said positive active material and said second lead wires with said paste of said negative active material form a composite structure;
   (d) repeating steps (a) through (c) to form a plurality of said composite structures;
   (e) stacking said plurality of composite structures one upon the other to form a stack of said composite structures;
   (f) interconnecting the terminal ends of said first lead wires at said first end of said support member to provide a positive lead termination for the stack of composite structures; and,
   (g) interconnecting the terminal ends of said second lead wires at said second end of said support member to provide a negative lead termination for the stack of composite structures.

2. The method according to claim 1, wherein providing the lead wires coated with paste of active material includes depositing a first layer of the paste of a positive active material in said alternate ones of said grooves, depositing a first layer of the paste of a negative active material in said remaining ones of said grooves, placing a lead wire in each of said grooves and then depositing a second layer of the pastes of positive and negative active material in said first and second grooves, respectively.

3. The method of claim 2, including the step of curing said pastes of positive and negative active material.

4. A method of making a cell for a battery comprising the steps of:
   (a) providing a support member of an electrically insulating material having a surface with a plurality of parallel grooves therein;
   (b) extruding a plurality of first lead wires with coating of a paste of a positive active material;
   (c) placing said coated first lead wires in first ones of said grooves with each of said first lead wires having a terminal end extending beyond a first end of said support member;
   (d) extruding a plurality of second lead wires with a coating of a paste of a negative active material;
   (e) placing said coated second wires in second ones of said grooves with each of said second lead wires having a terminal end extending beyond a second end of said support member;
   whereby said support member, said first lead wires with said paste of said positive active material and said second lead wires with said paste of said negative active material form a composite structure;
   (f) repeating steps (a) through (e) to form a plurality of said composite structures;
   (g) stacking said plurality of composite structures one upon the other to form a stack of said composite structures;
   (h) interconnecting the terminal ends of said first lead wires at said first end of said support member to provide a positive lead termination for the stack of composite structures; and,
   (i) interconnecting the terminal ends of said second lead wires at said second end of said support member to provide a negative lead termination for the stack of composite structures.

5. The method of claim 4, including the step of curing said pastes of positive and negative active material on said lead wires prior to placing the coated lead wires in said grooves of said support member.

6. The method according to claim 1, including the steps of compressing said stack of composite structure, and placing the compressed stack of composite structures into a containment means for maintaining the stack of composite structures in a confined geometry.

7. A method of making a battery structure comprising the steps of:
   providing a support member having a plurality of grooves provided in a common surface thereof;
   introducing a first layer of a paste of a positive active material into a first plurality of said grooves in said surface of said support member;
   introducing a first layer of a paste of a negative active material into a second plurality of said grooves in said surface of said support member;
   positioning a lead wire on said layer of paste in said first plurality of grooves with terminal ends of the lead wires extending beyond a first end of the support member;
   positioning a lead wire on said layer of paste in said second plurality of grooves with terminal ends of the lead wires extending beyond a second end of the support member;
   introducing a second layer of said paste of a positive active material into said first plurality of said grooves;
   introducing a second layer of said paste of a negative active material into said second plurality of said grooves;
   interconnecting the terminal ends of the lead wires at said first end of said support member and interconnecting the terminal ends of the lead wires at said second end of said support member to form a composite support/electrode structure.

8. The method according to claim 7, including forming a plurality of said composite structures and stacking said plurality of composite structures one upon the other to form a stack of said composite structures.

9. The method according to claim 7, including curing said pastes of said positive and negative active material prior to stacking said composite structures together.

10. The method according to claim 7, wherein introducing said pastes of active material includes introducing said first and second layers paste of positive active material into alternate ones of the grooves in said common surface, and introducing said first and second layers paste of negative active material into the remaining ones of the grooves in said common surface.

11. The method according to claim 7, including extruding said pastes of said positive and negative pastes of active materials onto the wires, and then curing said pastes of said positive and negative active material.

12. A battery structure comprising:
- a battery cell including a plurality of support members of an electrically insulating material and each having a plurality of grooves in a common surface thereof, each of said grooves having a first end and a second end;
- a positive paste of an active material disposed in alternate ones of said grooves of each support member;
- a negative paste of an active material disposed in the remaining ones of said grooves of each support member;
- a plurality of first lead wires each positioned in said paste of active material in a different one of said alternate grooves and having a terminal end extending beyond said first ends of said alternate grooves at a first end of said support member;
- and a plurality of second lead wires each positioned in said paste of negative active material in different one of said remaining grooves and having a terminal end extending beyond said second ends of said remaining grooves at a second end of said support member, whereby said support member, said paste of active material, and said lead wires form a composite structure, said composite structures being stacked one upon the other to form said battery cell, said terminal ends of said positive lead wires being interconnected at said first end of said support members to form a positive cell terminal and said terminal ends of said negative lead wires being interconnected at said second end of said support members to form a negative cell terminal.

13. The battery structure according to claim 12, including a plurality of said battery cells stacked together and electrically connected in parallel to form a high capacity multi-cell battery.

14. The battery structure according to claim 12, including a plurality of said battery cells stacked together and electically connected in series to form a high voltage multi-cell battery.

15. The battery structure according to claim 12, including containment material enclosing said stack of composite structures.

* * * * *